M. R. Fory,
Boring Wood.

No. 82,303.  Patented Sep. 22, 1868.

Witnesses:
Thos. A. Connelly
T. O. Connolly

Inventor.
M. R. Fory

United States Patent Office.

M. R. FORY, OF NEW YORK, N. Y.

*Letters Patent No. 82,303, dated September 22, 1868.*

---

IMPROVEMENT IN MACHINES FOR FELLING TREES.

---

The Schedule referred to in these Letters Patent and making part of the same.

---

Be it known that I, M. R. FORY, of the city of New York, in the county of New York, and State of New York, have invented a new and useful Machine for Felling Trees; and I do hereby declare that the following is a full, clear, and exact description of the construction and operation of the same, reference being had to the annexed drawings of the same, making part of this specification, in which—

Figure 1:
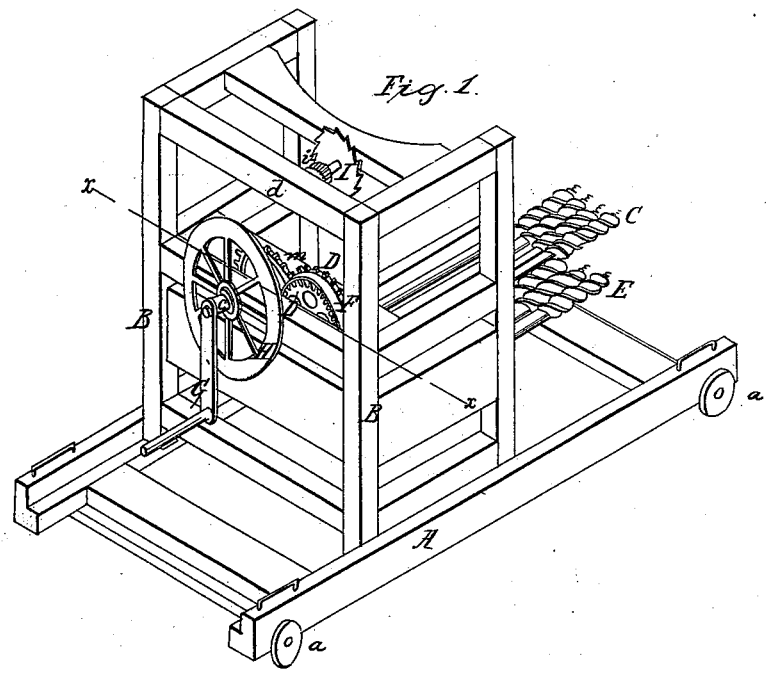

Figure 1 is a perspective view, and

Figure 2:
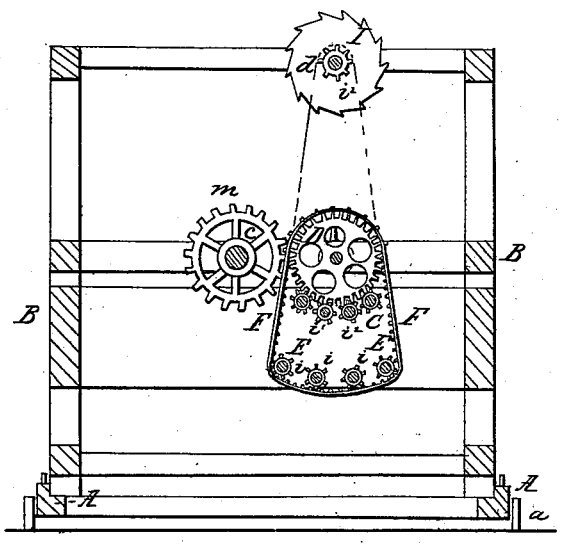

Figure 2 a vertical cross-section on line $x\ x$ of fig. 1.

A is a frame or truck, which, in the present instance, is mounted on wheels $a\ a$, and on this truck, between suitable guides, slides a frame, B, in bearings, on which turn parallel shafts $b\ c\ d$.

On the shaft $b$ is a double cog-wheel, D, the teeth on one part of which gear with those of a cog-wheel, $m$, on the shaft $c$, while the teeth on the other part of the wheel D gear with those on the inside of a cog-band, F, the latter also passing round and gearing with a number of pinions, $i$, on the shafts of parallel augers, E, turning in bearings on the frame of the machine.

In bearings, above the augers E, turn augers C, so arranged that pinions $i^1$ on the rear ends of the auger-shafts shall gear with the wheel D.

To the shaft $d$ are secured a pinion, $i^2$, and a circular saw, I, the shaft $d$ being so arranged that when the cog-band F is removed from the pinions $i$ it may be passed round the wheel D and round the pinion $i^2$, so as to drive the circular saw I.

When a tree is to be felled, the augers E are removed, and the belt F is detached, and the truck A is so arranged that the frame B may be moved on the truck to and from the tree, the augers C projecting towards the latter.

After a rotary motion is imparted to the shaft $c$, the frame B is moved towards the tree, which is soon penetrated by the revolving augers C.

The augers should revolve almost in contact with each other, so as to cut a continuous slot in the tree, and the number of augers should be such that a portion of the tree will be left at each side of the slot, this portion being removed by the axe after the machine has been withdrawn to such a distance as not to be injured by the falling tree.

Inasmuch as all the augers C are operated by a single wheel, D, they can be arranged in the close proximity required while the removal or addition of one or more augers to decrease or increase the size of the cut will not interfere with the operation of the remaining augers.

After the tree has been felled, the frame B is turned on its side, so as to bring the series of augers in a vertical line, the frame (being equal in height to its width) sliding as before on the truck. The latter is then brought opposite the fallen tree, the augers E are secured in their places, and the band F is passed round the pinions $i$. The frame B is now pushed towards the tree, the shaft $c$ being turned so as to operate both series of augers, which penetrate and cut the tree at two points. The truck A is afterwards moved laterally, and the above operation repeated until the entire tree is cut in pieces of the required length.

When smaller limbs or trees are to be cut in lengths, the cog-band F is passed from the pulley D round the pinion $i^2$, so as to operate its circular saw, by which the wood is cut in the ordinary manner.

I claim as my invention, and desire to secure by Letters Patent—

The frame B, carrying a series of permanent and a series of detachable augers, and constructed and adapted to the truck A, as and for the purpose described.

M. R. FORY.

Witnesses:
 THOS. A. CONNOLLY,
 T. C. CONNOLLY.